Patented May 16, 1933

1,909,719

UNITED STATES PATENT OFFICE

RALPH H. PRICE, OF CHICAGO, ILLINOIS, ASSIGNOR TO THE GLUE RESEARCH CORPORATION, OF NEW YORK, N. Y., A CORPORATION OF NEW YORK

DECALCOMANIA ADHESIVE

No Drawing.    Application filed September 12, 1930.  Serial No. 481,599.

This invention relates to decalcomania adhesive. One of the objects of my invention is to provide a new adhesive preparation particularly adapted for decalcomanias.

Another object of my invention is to provide a new adhesive which can be applied to varnished surfaces before such surfaces are dry, which adhesive will dry more quickly than the varnished covering, rendering it possible to stack and handle decalcomanias more quickly than otherwise would be the case.

In preparing the adhesive mixture of the present invention, the following ingredients are preferably used in the preparation:

| | Per cent |
|---|---|
| Glue | 13.5 |
| Water | 28.0 |
| Butanol | 7.3 |
| Toluol | 9.7 |
| Denatured alcohol | 26.8 |
| Turkey red oil | 14.7 |

The glue used may be a hide glue having a jelly test between 207 and 265 grams and a viscosity of not less than 60 nor more than 75 millipoises when tested by the methods of the American Glue Manufacturers Association, as described in the Journal of Industrial and Engineering Chemistry, volume 16, 3, March, 1924, on page 310. The organic solvents used, that is, butanol, toluol and alcohol, have the function of causing the adhesive to wet the varnished or lacquered surface without themselves having sufficient solvent action to adversely effect the lacquer or varnish, and the Turkey red oil serves as a plasticizer, since the decalcomania coatings must be sufficiently flexible so that they may be rolled without cracking the surface.

Of course, other organic solvents may be substituted for the butanol, alcohol and toluol, and other plasticizing agents, such for example, as the glycols may be used in place of Turkey red oil.

In practice, this typical formula is prepared by adding glue to the water, soaking for about an hour, and heating sufficiently to melt it and adding the mixture of butanol, toluol, alcohol and Turkey red oil. This mixture is added very slowly with vigorous agitation to the glue solution, carefully avoiding local concentration of the added mixture during the process. Agitation is continued until a thoroughly homogeneous mixture results.

This adhesive prepared as hereinbefore described may be easily applied to printed lacquer or varnished decalcomanias by any ordinary method, such as spraying, brushing, etc.

I claim:

As a new composition of matter, a decalcomania adhesive comprising substantially 13.5% glue, 28% water, 7.3% butanol, 9.7% toluol, 26.8% alcohol, 14.7% Turkey red oil.

Signed at Chicago, Ill., this 23rd day of August, 1930.

RALPH H. PRICE.